US011401458B2

(12) United States Patent
Li et al.

(10) Patent No.: US 11,401,458 B2
(45) Date of Patent: Aug. 2, 2022

(54) FRICTION REDUCER COMPOSITIONS

(71) Applicant: Saudi Arabian Oil Company, Dhahran (SA)

(72) Inventors: Wenwen Li, Pearland, TX (US); Rajesh Kumar Saini, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/007,952

(22) Filed: Aug. 31, 2020

(65) Prior Publication Data

US 2022/0064518 A1 Mar. 3, 2022

(51) Int. Cl.
*C09K 8/68* (2006.01)
*C09K 8/80* (2006.01)
*E21B 43/267* (2006.01)

(52) U.S. Cl.
CPC ............... *C09K 8/68* (2013.01); *C09K 8/80* (2013.01); *E21B 43/267* (2013.01); *C09K 2208/08* (2013.01); *C09K 2208/28* (2013.01)

(58) Field of Classification Search
None
See application file for complete search history.

(56) References Cited

U.S. PATENT DOCUMENTS

| 8,061,424 | B2 | 11/2011 | Willberg et al. |
| 10,023,782 | B2 | 7/2018 | Wang et al. |
| 2012/0214714 | A1* | 8/2012 | Whitwell ............ C09K 8/68 507/222 |
| 2013/0274149 | A1 | 10/2013 | Lafitte et al. |
| 2015/0072902 | A1 | 3/2015 | Lafitte et al. |
| 2015/0368541 | A1 | 12/2015 | Monclin et al. |
| 2016/0251567 | A1 | 9/2016 | Lin et al. |
| 2017/0341979 | A1 | 11/2017 | Hall et al. |
| 2018/0155615 | A1 | 6/2018 | Rahy et al. |
| 2019/0017203 | A1 | 1/2019 | Andoh et al. |

FOREIGN PATENT DOCUMENTS

| WO | 2013154926 | 10/2013 |
| WO | 2016077671 | 5/2016 |
| WO | 2020106272 | 5/2020 |

OTHER PUBLICATIONS

PCT International Search Report and Written Opinion in International Appln. No. PCT/US2021/048487, dated Dec. 23, 2021, 15 pages.

* cited by examiner

*Primary Examiner* — Andrew Sue-Ako
(74) *Attorney, Agent, or Firm* — Fish & Richardson P.C.

(57) ABSTRACT

Methods and systems for reducing friction in fracturing fluids are disclosed. An exemplary friction reducing composition includes a synthetic water-soluble polymer and a nanocellulose. This friction reducing composition is added to aqueous saline fluid for hydraulic fracturing treatment of hydrocarbon wells.

18 Claims, 4 Drawing Sheets

FRICTION REDUCER COMPOSITIONS

TECHNICAL FIELD

The present disclosure is directed to compositions that reduce friction during injection of fluids in downhole environments.

BACKGROUND

Slickwater fracturing is a fracture treatment that utilizes a large volume of water at a high flow rate and pressure to create fractures in a formation and carry proppant into the fractures. Due to the high injection rate, high friction is a problem for the slickwater as it flows through the tubulars to the well and into the well. Thus, a friction reducer is often incorporated in the fracturing fluids. A friction reducer is a chemical additive that alters fluid rheological properties to reduce friction created within the fluid, and between the fluid and walls of the pipeline as it flows through the pipeline. As a component in slickwater fracturing fluid, the friction reducer helps reduce the friction pressure caused by high injection rate.

SUMMARY

An embodiment described in examples herein provides a friction reducing composition. The friction reducing composition includes a synthetic water-soluble polymer and a nanocellulose. The friction reducing composition is added to aqueous saline fluid for hydraulic fracturing treatment of hydrocarbon wells.

Another embodiment described in examples herein provides a method for treating a well with a fracturing fluid. The method includes blending a synthetic water-soluble polymer into a base fluid, blending a nanocellulose into the base fluid, blending a proppant into the base fluid to form the fracturing fluid, and injecting the fracturing fluid into a subterranean zone to create fractures.

DETAILED DESCRIPTION

Figure 1:
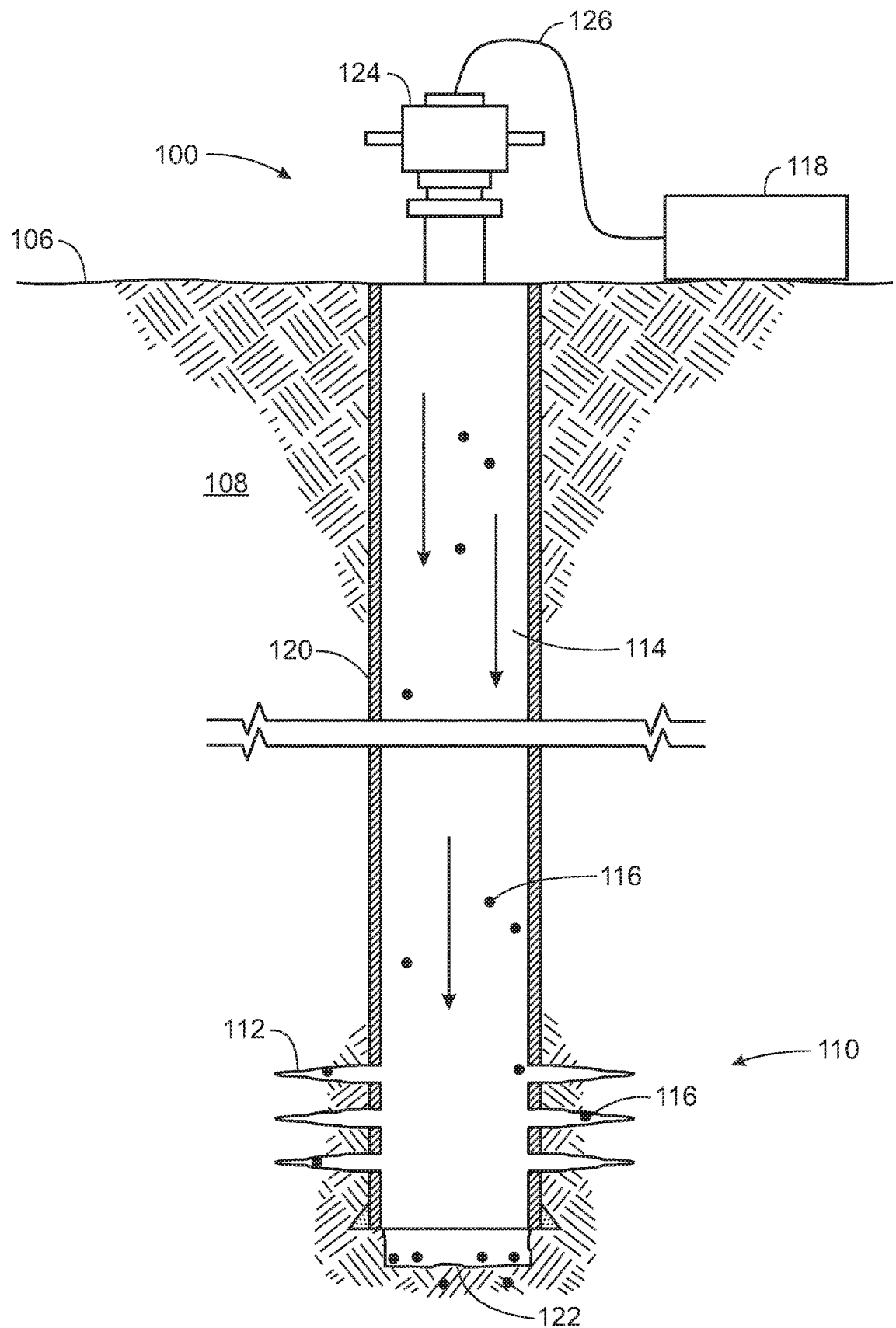
FIG. 1 depicts an example well that is treated with a fracturing fluid as described herein.

A common friction reducer used in slickwater fracturing is a polyacrylamide-based polymer. However, these polymers have a limited tolerance to metal ions, such as salts containing sodium, calcium, or magnesium, among others, which is measured as total dissolved solids (TDS) in a base fluid. As a result, the friction reduction performance decreases as the TDS of the base fluid is increased. Further, an increase in the TDS in the base fluid will also have a negative effect on the viscosity of the polymer solutions, reducing the ability of the fluid to transport proppants. The poor salt tolerance may limit the use of water having a high TDS content, such as sea water or produced water, as the base fluid for slickwater treatment. Accordingly, development of new friction reducer packages with that can maintain its performance under high salinity conditions, also termed a better salt tolerance, would help to reduce freshwater usage. In areas with limited amounts of freshwater, this would lower the competition of fracturing wells with other uses, such as domestic water needs.

Currently, a number of methods are used to enhance the salt tolerance of friction reducers, mainly to increase the viscosity of the friction reducers under high salt concentration conditions. For example, the amount of the friction reducer mixed into the base fluid may be increased. However, this can result in more polymer residue in the well, which may lead to reduction of permeability and damage to the formation.

As another example, a hybrid system is used in which the slickwater is pumped first, followed by the injection of fluid containing linear or cross-linked guar-based polymers to increase with higher viscosity to carry more proppants to the wellbore. However, the guar polymers used in the hybrid fracturing may also contain insoluble residues that can damage the formation. In other embodiments, salt water is diluted with fresh water to mitigate the negative effects of higher salt concentration on friction reducers.

In embodiments described herein, a friction reducing composition that is salt tolerant is provided. The friction reducing composition is a blend of a synthetic water-soluble polymer with nanocellulose. In some embodiments, the nanocellulose is a microfibrillated cellulose having nanoscale dimensions. As discussed with respect to the examples, this material showed better tolerance to salt than conventional acrylamide polymer based friction reducers, maintaining good friction reduction performance and viscosity in saltwater.

Compared to the water-soluble polymers used as friction reducers, a friction reducer based on a blend of synthetic water-soluble polymer with nanocellulose provides better salt tolerance. For example, the blend may achieve higher viscosity in synthetic saltwater, for example, having a TDS content over 50,000 mg/L, than previous materials while also maintaining a high friction reduction rate, such as greater than 65%, in synthetic saltwater.

The water-soluble polymer may be a homopolymer or copolymer. The nanocellulose can be microfibrillated cellulose (MFC), a nanocrystalline cellulose (NCC), or a bacterially generated nanocellulose. In some embodiments, the weight ratio of the synthetic water-soluble polymer and the nanocellulose is between about 0.05/1 and 9/1, or between 0.1/1 and 8/1, or between 0.2/1 and 5/1. In some embodiments, the weight ratio of the synthetic water-soluble polymer and the nanocellulose is about 1/1. In some embodiments, the weight ratio of the synthetic water-soluble polymer and the nanocellulose is about 0.5/1.

Various kinds of synthetic water-soluble polymers may be used in embodiments. For example, monomers used for the preparation of the synthetic water-soluble polymer can be selected from the group consisting of acrylamide, (meth) acrylamide, N,N-dimethylacrylamide, dimethyl(meth)acrylamide, $C_1$-$C_3$N-alkyl(meth)acrylamide, N-vinylpyrrolidone, N-vinyl acetamide, 4-acryloylmorpholine, N-isopropylacrylamide, N-(hydroxymethyl)acrylamide, N-(hydroxyethyl)acrylamide, N-[tris(hydroxymethyl) methyl]acrylamide, N-vinylpyrralidone, N-vinyl acetate and N-vinyl formamide, or any combinations thereof. In some implementations, additional functional monomers, such as cationic monomers, anionic monomers, or hydrophobic monomers, or any combinations thereof, can also be included in the monomer mixture to prepare the water-soluble polymers. Examples of cationic monomers include, but are not limited to acrylamidopropyltrimethyl ammonium halides, methacrylamidopropyltrimethyl ammonium halides, acryloyloxyethyltrimethyl ammonium halides, methacryloyloxyethyltrimethyl ammonium halides, acryloyloxyethyltrimethyl ammonium methyl sulfate, methacryloyloxyethyltrimethyl ammonium methyl sulfate, dimethylaminoethylmethacrylate, or dimethylaminopropylmethacrylamide, or any combinations thereof. Examples of anionic monomers that may be used in the synthetic water-soluble polymer include, but are not limited to (meth)acrylic acid and its salts (such as acrylic acid, sodium acrylate, ammonium acrylate, methacrylic acid, sodium methacrylate), 2-acrylamido-2-methylpropanesulfonic acid (AMPS) and its sodium salt, vinyl sulfonic acid and its salts (such as sodium vinyl sulfonate), styrene sulfonic acid and its salts, sulfomethylated acrylamide, allyl sulfonate; vinylphosphonic acid, allylphosphonic acid, and phosphonomethylated acrylamide or any combinations thereof. Examples of hydrophobic monomers that may be used in the synthetic water-soluble polymer include, but are not limited to $C_6$-$C_{18}$-alkylacrylates, $C_6$-$C_{18}$-N-alkylacrylamide, $C_6$-$C_{18}$-alkylmethacrylates, or $C_6$-$C_{18}$-N-alkylmethacrylamide, or any combinations thereof.

In some embodiments, the molecular weight of the synthetic water-soluble polymer may be between about 1,000,000 and about 20,000,000, as determined through intrinsic viscosities. In some embodiments, the molecular weight may be between about 2,000,000 and about 18,000,000, or between about 7,500,000 and about 15,000,000.

FIG. 1 depicts an example well 100 that is treated with a fracturing fluid as described herein. The well 100 extends from the surface 106 through the Earth 108 to one more subterranean zones of interest 110. Although the well 100 is shown as vertical, it would be clear that the well could also be horizontal, or at any angle in-between, to access a subterranean zone of interest 110 in a reservoir.

The well 100 enables access to the subterranean zones of interest 110 to allow the flow of fluids from the surface 106 to the subterranean zone of interest 110, for example, to create fractures 112 to allow the production of hydrocarbons from the subterranean zone of interest 110. In some embodiments, the subterranean zone of interest 110 includes an underground formation of tight or nonporous rock containing hydrocarbons (for example, oil, gas, or both). A fracturing fluid 114 that includes proppant 116 is flowed at a high velocity and pressure from a fracturing apparatus 118 at the surface 106, as indicated by the flow arrows. The high velocity and pressure of the fracturing fluid 114 is controlled to be sufficient to create the fractures 112 and carry the proppant 116 into the fractures. Accordingly, as described herein, the fracturing fluid 114 includes polymeric additives, termed slickwater additives herein, to lower the friction of the fluid flow through the wellbore 120. This is important for controlling the horsepower of the fracturing apparatus 118 and, thus, improving the economics of the fracturing process. Further, the fracturing fluid 114 must retain sufficient viscosity to hold the proppant 116, preventing the proppant 116 from settling to the bottom 122 of the wellbore 120.

As described herein, the polymeric additives are often sensitive to the concentration of salt in the fracturing fluid 114, making the use of seawater or produced water difficult. For example, mixing the polymeric additives with a highly saline fluid may cause a substantial drop in viscosity, allowing the proppant 116 to settle to the bottom 122 of the wellbore 120. The addition of the nanocellulose to the fracturing fluid 114 makes the fracturing fluid 114 less sensitive to the saline concentration, allowing the use of other base fluids, such as seawater or produced water.

In the schematic example of FIG. 1, the wellbore 120 is attached to a wellhead 124, which defines an attachment point for other equipment to be attached to the well 100, such as a line 126 from the fracturing apparatus 118. The line 126 also provides friction to the fracturing fluid 114, which benefits from the polymeric additives.

Figure 2:
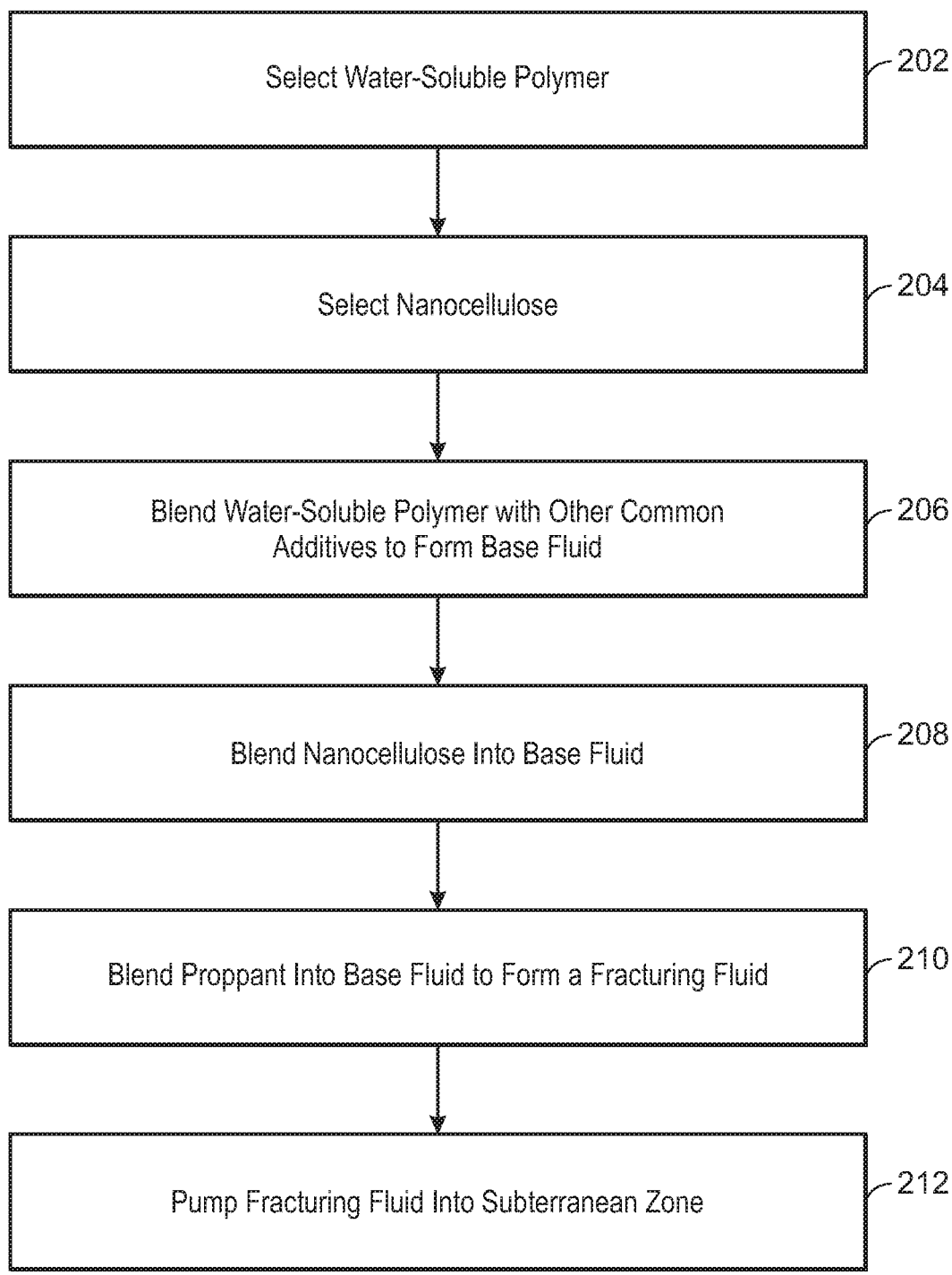
FIG. 2 is a process flow diagram of a method for fracturing a well using a slickwater fracturing fluid that includes a synthetic water-soluble polymer and nanocellulose.

FIG. 2 is a process flow diagram of a method 200 for fracturing a well using a slickwater fracturing fluid that includes a synthetic water-soluble polymer and nanocellulose. The method begins at block 202 with the selection of a suitable water-soluble polymer. The selection may be based on the temperature, salinity, pressure, hydrocarbons and other characteristics of the target subterranean zone. In some embodiments, the water-soluble polymer is a copolymer of an acrylamide and an AMPS, for example, with a molar percent of AMPS in the monomer mixture of in the range of 10 to 30%. In some embodiments the water-soluble polymer, the copolymer is a terpolymer of acrylamide, acrylic acid, and acrylate with long alkyl chain, for example, with a molar percent of acrylic acid about 10%, and a molar percent of an acrylate with a long alkyl chain of about 1% in the monomer mixture.

At block 204, a nanocellulose is selected. As described herein, the nanocellulose may be a microfibrillated cellulose, a nanocrystalline cellulose, or a bacterial nanocellulose. In some embodiments, the nanocellulose is a microfibrillated cellulose with a diameter of about 3-100 nanometers (nm) and a length of longer than 1 μm. In some embodiments, the nanocellulose is a nanocrystalline cellulose, with a diameter of about 2-100 nm and a length of about 50-500 nm.

At block 206, the water-soluble polymer is blended into the base fluid. In some embodiments, the water-soluble polymer is in a concentration of less than about 0.5 wt. %, less than about 0.4 wt. %, or less than about 0.3 wt. % in the base fluid. In some embodiments, the water-soluble polymer is in a concentration of greater than about 0.02 wt. %, greater than about 0.04 wt. %, or greater than about 0.08 wt. % in the base fluid. In some embodiments, the water-soluble polymer is in a concentration of between about 0.02 wt. % and about 0.5 wt. %, or of between about 0.04 wt. % and about 0.4 wt. %, or between about of between about 0.08 wt. % and about 0.3 wt. %. In some embodiments, the water-soluble polymer is blended into the base fluid in a concentration of about 0.2 wt. %.

At block 208, the nanocellulose is blended into the base fluid. In some embodiments, the nanocellulose is in a concentration of at less than about 1 wt. %, less than about 0.8 wt. %, less than about 0.6 wt. %, or less than about 0.5 wt. % in the base fluid. In some embodiments, the nanocellulose is in a concentration of greater than about 0.05 wt. %, greater than about 0.1 wt. %, greater than about 0.2 wt. %, or greater than about 0.3 wt. % in the base fluid. In some embodiments, the nanocellulose is in a concentration of between about 0.05 wt. % and about 1 wt. %, or of between about 0.1 wt. % and about 0.8 wt. %, or between about of between about 0.2 wt. % and about 0.5 wt. %. In some embodiments, the nanocellulose is blended into the base fluid in a concentration of about 0.2 wt. %. In some embodiments, the nanocellulose is blended into the base fluid in a concentration of about 0.4 wt. %.

In some embodiments, the base fluid is salt water having a concentration of total dissolved solids (TDS) of at least about 4,000 mg/L, at least about 10,000 mg/L, at least about 25,000 mg/L, at least about 50,000 mg/L, at least about 100,000 mg/L, or higher. In some embodiments, the base fluid is seawater having a concentration of total dissolved solids (TDS) of at least about at least about 10,000 mg/L, at least about 30,000 mg/L, or higher.

In some embodiments, the viscosity of a fluid containing a friction reducing composition of a blend of a synthetic water-soluble polymer with nanocellulose may be affected minimally by its TDS content. In some embodiments, the viscosity value of the fluid containing a friction reducing composition and having a TDS of around 50,000 mg/L, may be less than 25%, less than 15%, less than 5%, or less than 1%, lower than the viscosity value of a corresponding fluid containing the same friction reducing composition and having a TDS of around 4,000 mg/L, each as measured by a viscometer at a rotational speed of 300 revolutions per minute (rpm). The viscometer may be a Model 35 Viscometer (FANN).

At block 210, proppant and other additives are blended into the base fluid to form a fracturing fluid. In some embodiments, the proppant includes sand. In some embodiments, the proppant includes of gravel, glass, polymers, ceramics, silica, alumina, carbon black, graphite, mica, titanium dioxide, meta-silicate, calcium silicate, kaolin, talc, and fly ash or any combinations thereof.

At block 212, the fracturing fluid is injected into a subterranean zone. The injection is performed at a sufficient rate and pressure to create fractures in the subterranean zone. Further, the flow rate of the fracturing fluid is maintained at a sufficient rate to carry proppant into the fractures formed. In some embodiments, the injection rate is 40-120 bbl/min while pressure can be 5000-18000 psi. This pressure is after the addition of friction reducer. In some cases, the lack of a friction reducer will make it difficult to fracture a well. For example, if pressure required to break the well is 18,000 psi then the tubular used for the fracturing will have to be, at least, of that rating. Also, if friction losses are included, the pressure created by pumping will need to be above this pressure.

EXPERIMENTAL

For purposes of testing, water-soluble polymers were synthesized, allowing a study of the polymer composition and its effect on blend performance as a salt tolerant friction reducer. However, as polymer composition did not appear to have a strong effect on the performance or the improvement provided by the addition of the nanocellulose. Accordingly, less expensive water-soluble polymers, such as commercial polymers prepared from lower cost monomers, may be used as friction reducers in a high saline environment with the addition of nanocellulose.

Materials

Acrylamide monomer, purchased from Aldrich and used as received.

Acrylic acid monomer, purchased from Aldrich and used as received.

2-Acrylamido-2-methylpropane sulfonic acid (AMPS) monomer, purchased from Aldrich and used as received.

Dicyclopentanyl acrylate, purchased from Aldrich and used as received.

Oil Phase Solvent Supplied by SASOL

Emulsifier: Sorbitan monoester and polysorbate, supplied by Vantage.

tert-Butyl hydroperoxide 70% solution in water, purchased from Aldrich.

Sodium metabisulfite (SMBS), purchased from Aldrich.

Inverting surfactant: Secondary Alcohol Ethoxylate based noninoic surfactant, supplied by Dow Chemicals.

Microfibrillated cellulose (MFC), 2% in water, supplied by Exilva.

Procedure for Synthesis of Water-Soluble Polymer 1

Preparation of aqueous phase: 129 gram of acrylamide and 42 gram of 2-acrylamido-2-methylpropane sulfonic acid (AMPS) were mixed with 155 gram of deionized (DI) water in a beaker until a homogeneous solution formed. The pH was adjusted to about 7 using a 31 wt % sodium hydroxide solution.

Generation of water-in-oil (W/O) emulsion: first, 88 gram of oil phase solvent and 13.2 gram of emulsifier were charged to a reaction kettle equipped with a thermocouple, a nitrogen inlet and outlet, and mechanical stirring rod. The resulting mixture was stirred mixed until a homogeneous solution was formed. The aqueous phase was then added to the reaction kettle under overhead agitation to form a dispersion of the aqueous phase in a continuous oil phase.

Sparging: The resulting dispersion was sparged with nitrogen for 30-40 minutes at room temperature under agitation.

Initiation: 50 µL of tert-butyl hydroperoxide was added to the reactor, followed by slow addition of 7.5 mL of SMBS solution (12 mg/mL).

Polymerization: The reaction mixture was heated to maintain a temperature of between about 38° C. and about 42° C. for about 90 minutes.

Quenching: The residual monomers were scavenged (further reacted) by additional SMBS solution then cool down the rector for 30 min.

Packaging: After cooling the reactor, inverting surfactant was added to the emulsion under stirring. The final product was discharged and stored in plastic bottle for further analysis.

Procedure for Synthesis of Water-Soluble Polymer 2

Acrylamide and acrylic acid monomers were used to prepare this polymer following similar procedure as listed above with respect to water-soluble polymer 1. The molar ratio of acrylamide and acrylic acid was set at 90/10.

Procedure for Synthesis of Water-Soluble Polymer 3

Acrylamide, acrylic acid, and dicyclopentanyl acrylate monomers were used to prepare this polymer following similar procedure as listed above with respect to water-soluble polymer 1. The molar ratio of acrylamide, acrylic acid and dicyclopentanyl acrylate was set at 90/9/1.

Molecular Weight Determination

The molecular weights of water-soluble polymers were determined by intrinsic viscosities using the Mark-Houwink equation, the molecular weight of water-soluble polymer 1 was determined to be about 5,000,000. The molecular weight of water-soluble polymer 2 was determined to be about 10,000,000. The molecular weight of water-soluble polymer 3 was determined to be about 12,000,000.

Preparation of Synthetic Salt Water 1

1.31 g of NaCl, 1.11 g of $CaCl_2$, 0.48 g of $MgCl_2$, 0.89 g of $Na_2SO_4$ and 0.19 g of $NaHCO_3$ were dissolved in 1 L of DI water. The total dissolved solids (TDS) in synthetic salt water 1 was around 4,000 mg/L. Synthetic salt water 1 was used for viscosity and friction reduction evaluation, as described herein.

Preparation of Synthetic Salt Water 2

38.55 g of NaCl, 2.3 g of $CaCl_2 \cdot 2H_2O$, 7.83 g of $MgCl_2$, 6.06 g of $Na_2SO_4$ and 0.26 g of $NaHCO_3$ was dissolved in 1 L of DI water. The total dissolved solids (TDS) in synthetic salt water 2 was around 57,000 mg/L. Synthetic salt water 2 was used for viscosity and friction reduction evaluation, as described herein.

Viscosity Measurement

A blend of synthesized water-soluble polymer and nanocellulose was dispersed in either tap water (about 130 mg/L TDS) or synthetic saltwater. Detailed compositions were summarized in Table 1 and 2. Viscosity of each solution was measured using a Model 35 Viscometer (FANN) at 6, 50, 100, 200, 300 and 600 rpm, respectively.

Friction Reduction Performance Evaluation

The friction reduction performance was tested using the Model 6500-M Mini-Loop™ from Chandler Ametek. A differential pressure transmitter measures the friction pressure across the test section. The flow rate was set at 4 GPM. The injection pressure is typically around 35 psi. Tubing diameter—⅜" OD, 0.28" ID. Synthetic salt water 2 were used as base fluid.

Results and Discussion

Viscosity Profile

Figure 3:
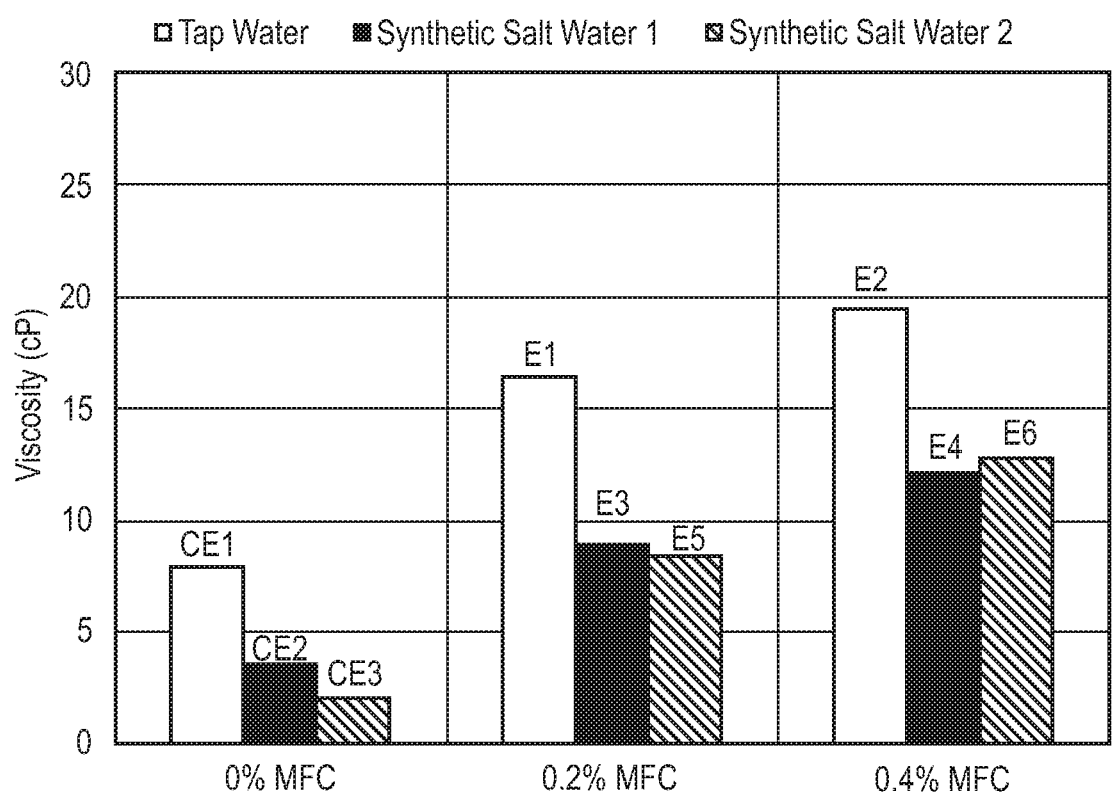
FIG. 3 is a plot of viscosity data of blends of water-soluble polymer 1 and microfibrillated cellulose in tap water and the two kinds of synthetic saltwater with different salt concentrations.

FIG. 3 is a plot 300 of viscosity data of blends of water-soluble polymer 1 and microfibrillated cellulose in tap water and the two kinds of synthetic salt water with different concentrations. The viscosity data of the new friction reducers based on blends of water-soluble polymer 1 and MFC in both fresh (tap) water and saltwater is summarized in Table 3 and FIG. 3.

As discussed herein, when a friction reducer based on only water-soluble polymer was used, a drop of viscosity was observed when the base fluid was changed from tap water to salt water. A higher salt concentration correlated with a lower viscosity. For example, the viscosity for water-soluble polymer 1 was determined to be 7.9 cps in tap water at 300 rpm, but decreased to 3.5 cps in synthetic salt water 1 (TDS ~4,000 mg/L) at the same polymer loading level. The viscosity further decreased to 2.0 cps in salt water 2 (TDS ~57,000 mg/L). These results are shown in the plot of FIG. 3 as comparative example 1 (CE1), comparative example 2 (CE2), and comparative example 3 (CE3).

Comparing to friction reducer based on water-soluble polymer only, the new friction reducers based on blends of water-soluble polymer 1 with microfibrillated cellulose (MFC) led to an increase of viscosity in both tap water and salt water. For example, with the incorporation of 0.2% MFC, the viscosity of the new friction reducer at 300 rpm was measured to be 16.4 cps in tap water, shown as Example 1 (E1) and around 8.5 cps in both synthetic salt water 1 and 2. No further decrease of solution viscosity was observed when the salt concentration in the solution was increased from 4,000 mg/L to 57,000 mg/L, as shown for Example 3 (E3) and Example 5 (E5), measured in salt water 1 and 2, respectively.

Similar results were observed when the concentration of MFC in the new friction reducer composition was increased from 0.2% to 0.4%. The initial solution viscosity was measured at about 17 cps, shown as Example 2 (E2), while the viscosity was measured at about 12.5 cps in synthetic salt water 1 and 2 at 300 rpm, shown as Examples 4 (E4) and 6 (E6). This indicates a better resistance to salt with the new friction reducer compositions, as minimal decrease of solution viscosity was noted with an increase of salt concentration.

Figure 4:
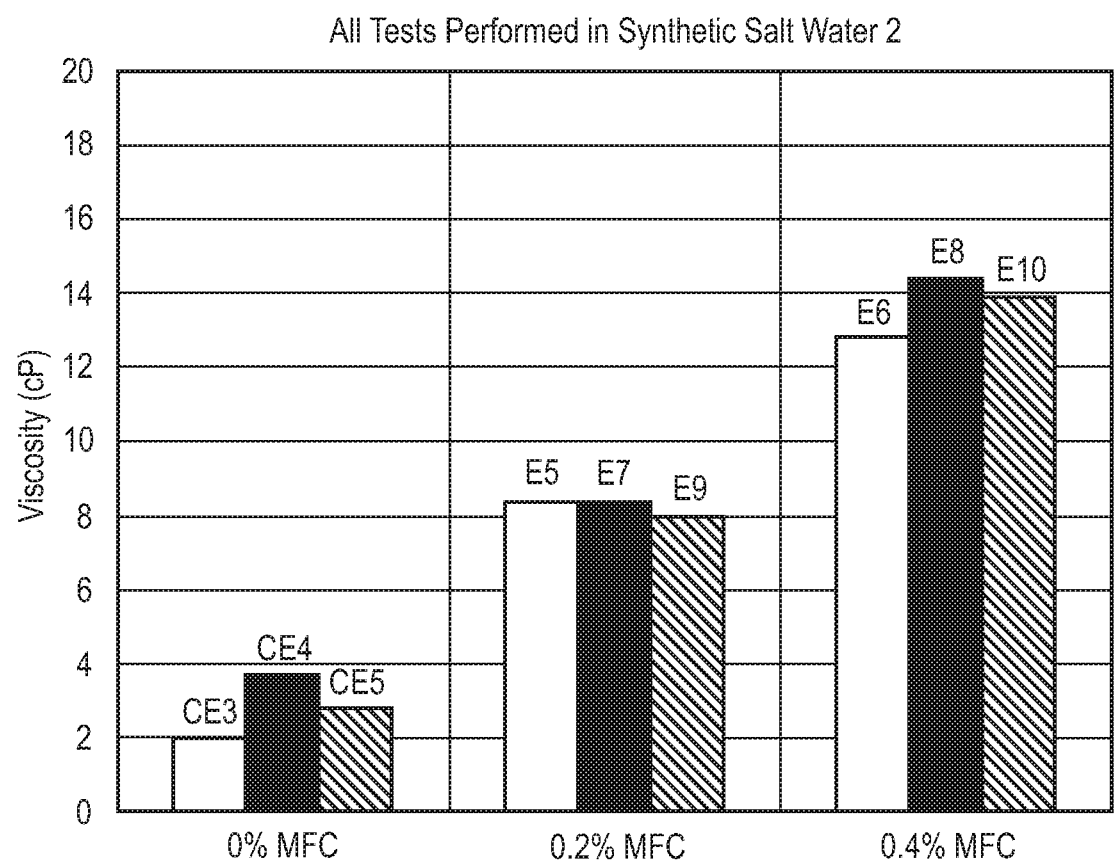
FIG. 4 is a plot of viscosity data of blends of different compositions of water-soluble polymers and microfibrillated cellulose in synthetic saltwater 2.

FIG. 4 is a plot 400 of viscosity data of blends of different compositions of water-soluble polymers and microfibrillated cellulose in synthetic salt water 2. The viscosity data of new friction reducers based on blends of water-soluble polymers with different compositions and MFC in synthetic salt water 2 is summarized in Table 4 and FIG. 4.

The effect on water-soluble polymer compositions on its viscosity in salt water was first studied and compared. With the adjustment of polymer compositions and molecular weight, slightly higher viscosity in salt water was observed for Comparative Example 4 and 5 vs. Comparative Example 3, but still very low, less than 4 cps at 300 rpm (FIG. 4).

As a comparison, higher viscosity in salt water was observed for new friction reducers based on the blends of water-soluble polymer with MFC. Viscosity of the new friction reducers at 300 rpm was measured to be about 8 cps with 0.2% of MFC, as shown by examples E5, E7, and E9. Further, the viscosity of the new friction reducers at 300 RPM was measured to be greater than 12 cps with 0.4% of MFC, as shown by examples E6, E8, and E10. It may be noted that changing the compositions of the water-soluble polymers had a limited impact on the blend viscosity in salt water, especially under high shear conditions, e.g., greater than 100 rpm. Accordingly, the water-soluble polymer in the new friction reducer package may be prepared from low cost monomers while the friction reduction package can still maintain good viscosity profile under high salt conditions.

In addition, the viscosity of pure MFC in salt water 2 was also analyzed as comparison (Comparative Example 6 in Table 4). The viscosity was determined to be 5.5 cps at 300 rpm and loading level of 0.4%, much lower than that of new friction reducer based on water-soluble polymer and MFC blends. These results further confirmed a synergetic effect on viscosity occurred when water-soluble polymer was mixed together with MFC especially under high shear conditions, which would not be achieved by MFC or water-soluble polymer only at the same concentration.

Friction Reduction Performance

As described herein, the friction reduction performance was tested using the Miniflow loop, model 6500-M from Chandler Ametek with flow rate set at 4 GPM. The new friction reducer package showed good friction reduction performance in the synthetic salt water. For instance, friction reduction rate can reach 65-70% even at a low loading level of water soluble polymer and MFC blend (0.04 wt % of water soluble polymer 1 and 0.1 wt % of MFC) in synthetic salt water 2.

An embodiment described in examples herein provides a friction reducing composition. The friction reducing composition includes a synthetic water-soluble polymer and nanocellulose. This friction reducing composition can be added to aqueous saline fluid for hydraulic fracturing treatment of hydrocarbon wells.

In an aspect, the saline fluid includes greater than 4,000 mg/L of total dissolved solids (TDS). In an aspect, the saline fluid includes greater than 50,000 mg/L of total dissolved solids (TDS).

In an aspect, the synthetic water-soluble polymer is prepared from a monomer including acrylamide, (meth)acrylamide, $C_1$-$C_3$ N-alkyl(meth)acrylamide, N,N-dimethylacrylamide, dimethyl(meth)acrylamide, N-vinylpyrrolidone, N-vinyl acetamide, 4-acryloylmorpholine, N-isopropylacrylamide, N-(hydroxymethyl)acrylamide, N-(hydroxyethyl) acrylamide, N-[tris(hydroxymethyl)methyl]acrylamide, N-vinyl acetate, and N-vinyl formamide, or any combinations thereof.

In an aspect, the synthetic water-soluble polymer may further include of a functionalized monomer including a cationic monomer, an anionic monomer, or a hydrophobic monomer, or any combinations thereof.

In an aspect, the cationic monomer includes acrylamidopropyltrimethyl ammonium halides, methacrylamidopropyltrimethyl ammonium halides, acryloyloxyethyltrimethyl ammonium halides, methacryloyloxyethyltrimethyl ammonium halides, acryloyloxyethyltrimethyl ammonium methyl sulfate, methacryloyloxyethyltrimethyl ammonium methyl sulfate, dimethylaminoethylmethacrylate, or dimethylaminopropylmethacrylamide, or any combinations thereof.

In an aspect, the anionic monomer includes acrylic acid, methacrylic acid, 2-acrylamido-2-methylpropane sulfonic acid (AMPS), or their corresponding salts, or any combinations thereof. In an aspect, the hydrophobic monomer includes C6-C18 alkyl acrylates, $C_6$-$C_{18}$ alkyl methacrylates, $C_6$-$C_{18}$ N-alkyl acrylamide, or $C_6$-$C_{18}$ N-alkyl methacrylamide, or any combinations thereof.

In an aspect, a molecular weight of the synthetic water-soluble polymer is between about 1,000,000 and 20,000,000. In an aspect, a molecular weight of the synthetic water-soluble polymer is between about 5,000,000 and 15,000,000.

In an aspect, the nanocellulose includes a microfibrillated cellulose. In an aspect, the nanocellulose includes a mircofibrillated cellulose, a nanocrystalline cellulose, bacterial nanocellulose, or any combinations thereof.

In an aspect, the friction reduction compositions reduce fluid friction by 60% and more relative to a corresponding fluid that does not contain the friction reduction compositions. In an aspect, the viscosity value of a saline fluid containing the friction reducing composition and having a TDS of around 50,000 mg/L, is less than 25% lower than the viscosity value of a corresponding fluid containing the same friction reducing composition and having a TDS of around 4,000 mg/L measured by a viscometer at a rotational speed of 300 revolutions per minute (rpm).

In an aspect, a concentration of 0.1 wt. % of microfibrillated cellulose and 0.04 wt. % of water soluble polymer reduces the friction by between 65% and 70% in a saline solution including about 57,000 mg/L of total dissolved solids. In an aspect, the friction reducing composition has a viscosity of greater than 8 cps at a concentration of 0.2 wt. % of microfibrillated cellulose and 0.2 wt. % water soluble polymer in a saline solution including between 0 mg/L and 60,000 mg/L of total dissolved solids measured by a viscometer at a rotational speed of 300 revolutions per minute (rpm). In an aspect, the friction reducing composition has a viscosity of greater than 12 cps at a concentration of 0.4 wt. % of microfibrillated cellulose and 0.2 wt. % water soluble polymer in a saline solution including between 0 mg/L and 60,000 mg/L of total dissolved solids measured by a viscometer at a rotational speed of 300 revolutions per minute (rpm).

Another embodiment described in examples herein provides a method for treating a well with a fracturing fluid. The method includes blending a synthetic water-soluble polymer into a base fluid, blending a nanocellulose into the base fluid, blending a proppant into the base fluid to form the fracturing fluid, and injecting the fracturing fluid into a subterranean zone to create fractures.

In an aspect, the synthetic water-soluble polymer is a copolymer of acrylamide and acrylic acid. In an aspect, the synthetic water-soluble polymer is a copolymer of acrylamide and 2-acrylamido-2-methylpropanesulfonic acid. In an aspect, the synthetic water-soluble polymer is blended into the base fluid at a concentration of between about 0.02 wt. % and about 0.5 wt. %.

Other implementations are also within the scope of the following claims.

TABLE 1

Friction reducer compositions.

| | Example 1 (E1) | Example 2 (E2) | Example 3 (E3) | Example 4 (E4) | Example 5 (E5) | Example 6 (E6) | Comparative Example 1 (CE1) | Comparative Example 2 (CE2) | Comparative Example 3 (CE3) |
|---|---|---|---|---|---|---|---|---|---|
| Water-soluble polymer 1 emulsion | 1 g | 1 g | 1 g | 1 g | 1 g | 1 g | 1 g | 1 g | 1 g |
| Microfibrillated cellulose (2% in water) | 20 g | 40 g | 20 g | 40 g | 20 g | 40 g | | | |
| Tap water | 200 mL | 200 mL | | | | | 200 mL | | |
| Synthetic salt water 1 | | | 200 mL | 200 mL | | | | 200 mL | |
| Synthetic salt water 2 | | | | | 200 mL | 200 mL | | | 200 mL |

TABLE 2

Friction reducer compositions-continued.

| | Example 7 (E7) | Example 8 (E8) | Example 9 (E9) | Example 10 (E10) | Comparative Example 4 (CE4) | Comparative Example 5 (CE5) | Comparative Example 6 (CE6) |
|---|---|---|---|---|---|---|---|
| Water-soluble polymer 2 emulsion | 1 g | 1 g | | | 1 g | | |
| Water-soluble polymer 3 emulsion | | | 1 g | 1 g | | 1 g | |
| Microfibrillated cellulose (2% in water) | 20 g | 40 g | 20 g | 40 g | | | 40 g |
| Synthetic salt water 2 | 200 mL | 200 mL | 200 mL | 200 mL | 200 mL | 200 mL | 200 mL |

TABLE 3

Viscosity data of water-soluble polymer 1 and MFC blends in tap water and salt water.

| | Tap water | | | Synthetic salt water 1 | | | Synthetic salt water 2 | | |
|---|---|---|---|---|---|---|---|---|---|
| shear rate (rpm) | Comparative Example 1 (CE1) 0 wt. % MFC | Example 1 (E1) 0.2 wt. % MFC | Example 2 (E2) 0.4 wt. % MFC | Comparative Example 2 (CE2) 0 wt. % MFC | Example 3 (E3) 0.2 wt. % MFC | Example 4 (E4) 0.4 wt. % MFC | Comparative Example 3 (CE3) 0 wt. % MFC | Example 5 (E5) 0.2 wt. % MFC | Example 6 (E6) 0.4 wt. % MFC |
| 6 | 63.0 | 113.4 | 147.4 | 49.1 | 79.4 | 93.6 | 8.8 | 41.0 | 86.6 |
| 50 | 8.7 | 31.6 | 41.2 | 1.2 | 13.7 | 19.5 | 1.2 | 10.3 | 21.0 |
| 100 | 9.4 | 22.8 | 29.4 | 2.3 | 10.6 | 12.0 | 1.7 | 7.5 | 16.4 |
| 200 | 8.5 | 16.9 | 21.7 | 3.3 | 8.2 | 11.8 | 1.7 | 8.7 | 11.5 |
| 300 | 7.9 | 16.4 | 19.5 | 3.5 | 8.9 | 12.1 | 2.0 | 8.4 | 12.8 |
| 600 | 7.2 | 13.8 | 16.9 | 3.4 | 7.9 | 10.7 | 2.4 | 7.8 | 12.6 |

TABLE 4

Viscosity data of various water-soluble polymers and WC blends in synthetic salt water 2.

| shear rate (rpm) | Comparative Example 3 (CE3) 0% MFC | Example 5 (E5) 0.2 wt. % MFC | Example 6 (E6) 0.4 wt. % MFC | Comparative Example 4 (CE4) 0 wt. % MFC | Example 7 (E7) 0.2 wt. % MFC | Example 8 (E8) 0.4 wt. % MFC | Comparative Example 5 (CE5) 0 wt. % MFC | Example 9 (E9) 0.2 wt % MFC | Example 10 (E10) 0.4 wt. % MFC | Comparative Example 6 (CE6) 0.4 wt. % MFC only |
|---|---|---|---|---|---|---|---|---|---|---|
| 6 | 8.8 | 41.0 | 86.6 | 28.5 | 43.5 | 69.7 | 23.4 | 39.2 | 63.7 | 49.0 |
| 50 | 1.2 | 10.3 | 21.0 | 4.7 | 12.5 | 20.3 | 3.5 | 9.3 | 16.3 | 13.3 |
| 100 | 1.7 | 7.5 | 16.4 | 3.5 | 8.4 | 15.5 | 2.9 | 7.1 | 12.0 | 9.6 |
| 200 | 1.7 | 8.7 | 11.5 | 3.5 | 8.7 | 13.5 | 2.9 | 8.2 | 11.5 | 6.8 |
| 300 | 2.0 | 8.4 | 12.8 | 3.7 | 8.4 | 14.4 | 2.8 | 8.0 | 13.9 | 5.5 |
| 600 | 2.4 | 7.8 | 12.6 | 3.8 | 7.3 | 13.5 | 3.5 | 7.5 | 12.4 | 4.5 |

What is claimed is:

1. A friction reducing composition, comprising a synthetic water-soluble polymer and a microfibrillated cellulose (MFC) nanocellulose, added to aqueous saline fluid for hydraulic fracturing treatment of hydrocarbon wells, wherein the aqueous saline fluid comprises between 4,000 ppm and 57,000 ppm total dissolved solids, wherein the friction reducing composition comprises a concentration of about 0.1 wt. % of the microfibrillated cellulose (MFC), and wherein the viscosity of the friction reducing composition at 300 RPM is greater than either the viscosity of the synthetic water-soluble polymer alone or the MFC alone in the aqueous saline fluid.

2. The friction reducing composition of claim 1, wherein the saline fluid comprises greater than 4,000 mg/L of total dissolved solids (TDS).

3. The friction reducing composition of claim 1, wherein the saline fluid comprises greater than 50,000 mg/L of total dissolved solids (TDS).

4. The friction reducing composition of claim 1, wherein the synthetic water-soluble polymer is prepared from a monomer comprising acrylamide, (meth)acrylamide, $C_1$-$C_3$ N-alkyl(meth)acrylamide, N,N-dimethylacrylamide, dimethyl(meth)acrylamide, N- vinylpyrrolidone, N-vinyl acetamide, 4-acryloylmorpholine, N-isopropylacrylamide, N-(hydroxymethyl)acrylamide, N-(hydroxyethyl)acrylamide, N-[tris(hydroxymethyl)methyl]acrylamide, N-vinyl acetate, and N-vinyl formamide, or any combinations thereof.

5. The friction reducing composition of claim 1, wherein the synthetic water-soluble polymer may further comprise of a functionalized monomer comprising a cationic monomer, an anionic monomer, or a hydrophobic monomer, or any combinations thereof.

6. The friction reducing composition of claim 5, wherein the functionalized monomer comprises the cationic monomer, wherein the cationic monomer comprises acrylamidopropyltrimethyl ammonium halides, methacrylamidopropyltrimethyl ammonium halides, acryloyloxyethyltrimethyl ammonium halides, methacryloyloxyethyltrimethyl ammonium halides, acryloyloxyethyltrimethyl ammonium methyl sulfate, methacryloyloxyethyltrimethyl ammonium methyl sulfate, dimethylaminoethylmethacrylate, or dimethylaminopropylmethacrylamide, or any combinations thereof.

7. The friction reducing composition of claim 5, wherein the functionalized monomer comprises the anionic monomer, wherein the anionic monomer comprises acrylic acid, methacrylic acid, 2-acrylamido-2-methylpropane sulfonic acid (AMPS), or their corresponding salts, or any combinations thereof.

8. The friction reducing composition of claim wherein the functionalized monomer comprises the hydrophobic monomer, wherein the hydrophobic monomer comprises $C_6$-$C_{18}$ alkyl acrylates, $C_6$-$C_{18}$ alkyl methacrylates, $C_6$-$C_{18}$ N-alkyl acrylamide, or $C_6$-$C_{18}$ N-alkyl methacrylamide, or any combinations thereof.

9. The friction reducing composition of claim 1, wherein a molecular weight of the synthetic water-soluble polymer is between about 1,000,000 and 20,000,000.

10. The friction reducing composition of claim 1, wherein a molecular weight of the synthetic water-soluble polymer is between about 5,000,000 and 15,000,000.

11. The friction reducing composition of claim 1, wherein the friction reducing composition further comprises a nanocrystalline cellulose, bacterial nanocellulose, or any combinations thereof.

12. The friction reducing composition of claim 1, wherein the friction reduction compositions reduce fluid friction by 60% or more relative to a corresponding fluid that does not contain the friction reduction compositions.

13. The friction reducing composition of claim 1, wherein the viscosity value of a saline fluid containing the friction reducing composition and having a TDS of around 50,000 mg/L, is less than 25% lower than the viscosity value of a corresponding fluid containing the same friction reducing composition and having a TDS of around 4,000 mg/L measured by a viscometer at a rotational speed of 300 revolutions per minute (rpm).

14. The friction reducing composition of claim 1, wherein a concentration of 0.1 wt. % of microfibrillated cellulose and 0.04 wt. % of water soluble polymer reduces the friction by between 65% and 70% in a saline solution comprising about 57,000 mg/L of total dissolved solids.

15. A method for treating a well with a fracturing fluid, comprising:
   blending a synthetic water-soluble polymer into a base fluid, wherein the base fluid comprises an aqueous saline fluid comprising between 4,000 ppm and 57,000 ppm total dissolved solids;
   blending a microfibrillated cellulose (MFC) nanocellulose into the base fluid;
   blending a proppant into the base fluid to form the fracturing fluid, wherein the fracturing fluid comprises a concentration of about 0.1 wt. % of the MFC, wherein the viscosity of the fracturing fluid at 300 RPM is greater than either the viscosity of the synthetic water-soluble polymer alone or the MFC alone in the aqueous saline fluid; and
   injecting the fracturing fluid into a subterranean zone to create fractures.

16. The method of claim 15, wherein the synthetic water-soluble polymer is a copolymer of acrylamide and acrylic acid.

17. The method of claim 15, wherein the synthetic water-soluble polymer is a copolymer of acrylamide and 2-acrylamido-2-methylpropanesulfonic acid.

18. The method of claim 15, wherein the synthetic water-soluble polymer is blended into the base fluid at a concentration of between about 0.02 wt. % and about 0.5 wt. %.

* * * * *